Jan. 21, 1941. C. E. CARPENTER 2,229,167
DOUGHNUT MACHINE AND THE LIKE
Filed May 1, 1939 4 Sheets-Sheet 1
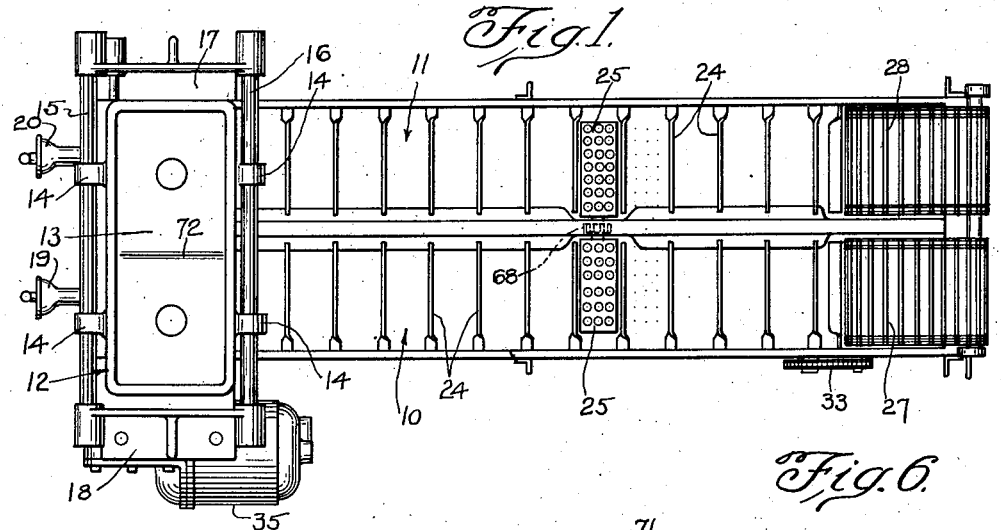
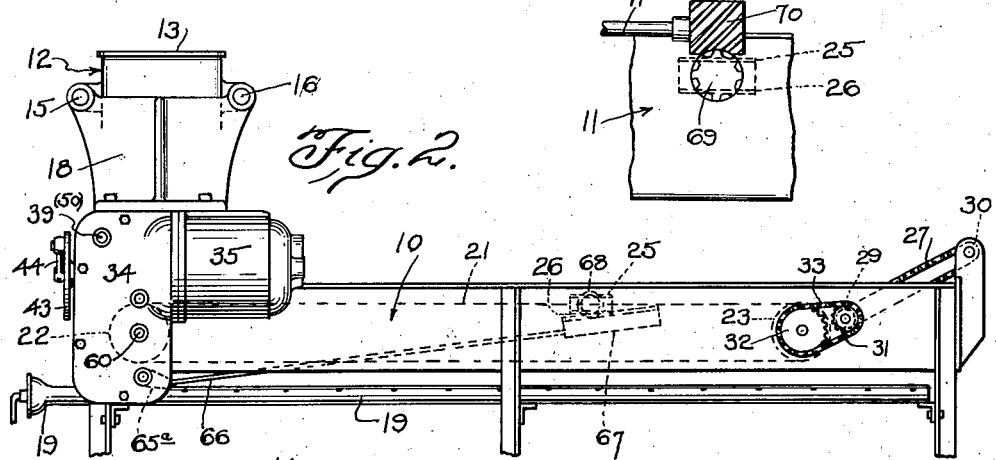
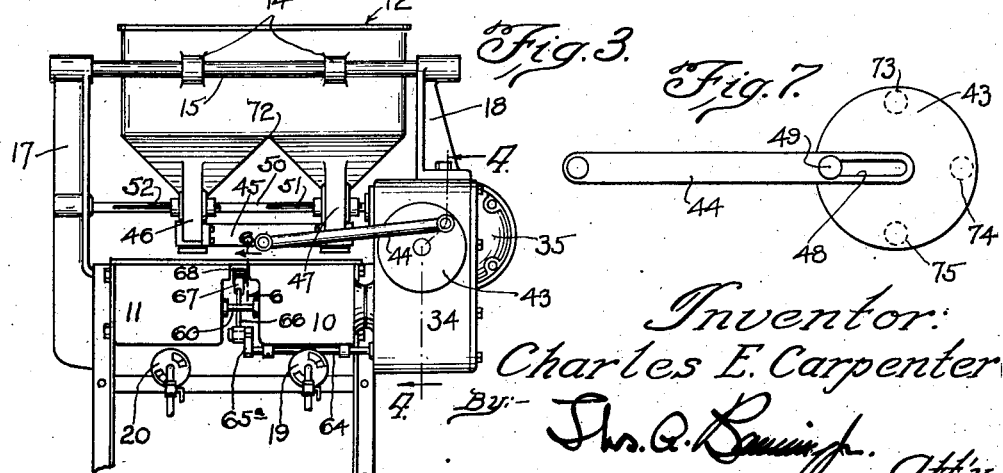
Inventor:
Charles E. Carpenter Jan. 21, 1941. C. E. CARPENTER 2,229,167
DOUGHNUT MACHINE AND THE LIKE
Filed May 1, 1939 4 Sheets-Sheet 2
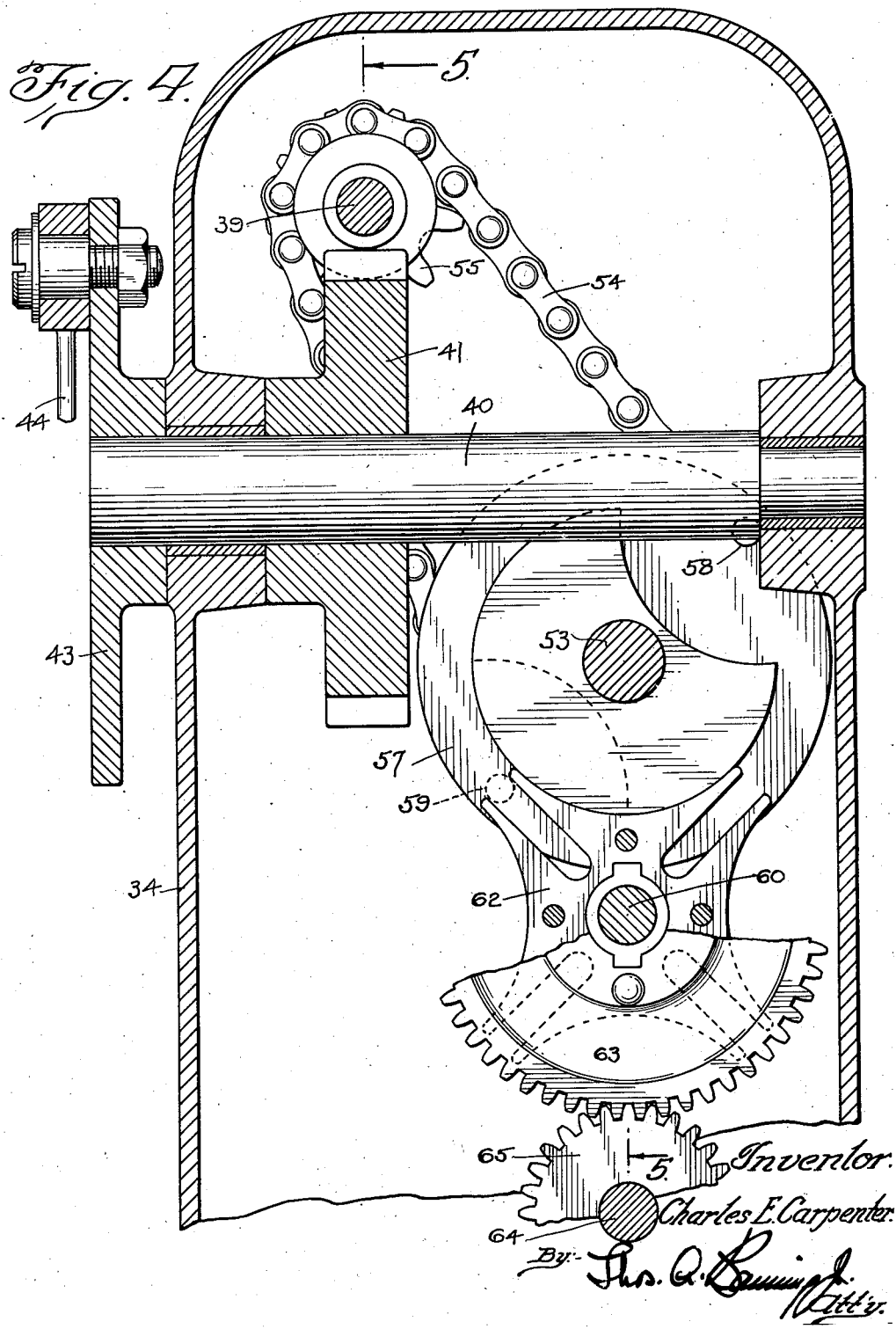

Jan. 21, 1941. C. E. CARPENTER 2,229,167
DOUGHNUT MACHINE AND THE LIKE
Filed May 1, 1939 4 Sheets-Sheet 3

Inventor:
Charles E. Carpenter

Jan. 21, 1941. C. E. CARPENTER 2,229,167
DOUGHNUT MACHINE AND THE LIKE
Filed May 1, 1939 4 Sheets-Sheet 4

Inventor:
Charles E. Carpenter
By:- [signature]
Att'y.

Patented Jan. 21, 1941

2,229,167

UNITED STATES PATENT OFFICE 2,229,167

DOUGHNUT MACHINE AND THE LIKE

Charles E. Carpenter, Chicago, Ill.

Application May 1, 1939, Serial No. 271,120

19 Claims. (Cl. 53—7)

This invention relates to improvements in doughnut machines and the like, and more particularly, to improvements in such machines which operate automatically to cut and deliver the dough batches into the frying pan at relatively high speeds, such machines being especially intended for commercial uses. It will presently appear, however, that I do not intend to limit my invention or the use thereof to such commercial machines, except as I may do so in the claims to follow; but I shall nevertheless refer to certain of the operating conditions of such machines as illustrative of conditions which my present invention is intended to meet in practice.

In order to increase the capacity of doughnut machines measured in doughnuts which may be cut and fried per hour, it has heretofore been known to make use of a frying pan of width sufficient to accommodate more than a single row of doughnuts, and to provide a doughnut cutter above such pan for dropping the dough batches into the pan, such cutter being moved back and forth across the pan with regular movements, dropping the dough batches into the hot grease, one at a time, in the various rows; and it has also been known to provide means to advance such rows along the pan. It has also been known to provide above such a pan a dough batch cutter having two or more dough batch cutting devices, so that two or more dough batches may be simultaneously dropped into the grease of the pan at proper row positions. When it is desired to keep more than two such rows filled with the dough batches, with such an arrangement, as for example, four rows, it has been found that the time interval between the dropping of the first dough batch of a cycle of operations, and the last dough batch of such cycle, is so great that the various dough batches are not uniformly fried, and the difference between the various doughnuts so produced is great enough to seriously interfere with their saleability. Generally it may be stated, however, that such difference as between two dough batches produced in a cycle of only two operations is not sufficient to seriously impair the uniformity of the product.

It has also been found that if a single dough batch cutter be provided with two or more throats and cut-off sleeves located as close together as the rows in the frying pan, the dough moving down to one such throat will interfere with that moving down to the other throat, so that one or the other such throat will rob the other throat of its proper share of dough, with the result that the two throats will not produce dough batches of uniformity, and of equal size. It has been found that to secure such uniformity and equality of size of the batches it is necessary to locate the throats further apart than the distance between center lines of the rows in the pan. Heretofore it has been undesirable to create such additional spacing, because the pan and the grease therein cannot then be used to the fullest advantage and economy.

According to one feature of the present invention I propose to provide a dough batch cutter having a pair of throats and dough batch cutting devices thereof located at greater spacing than the distance between center lines of two adjacent rows of dough batches in the pan, for example, double such distance, so that the dough will properly and uniformly move to both such throats, and to provide means to move such cutter back and forth above the pan in such manner as to drop the batches into all the rows of the pan, for example, four rows. By this means I am able to supply more than two rows of the pan with their needed dough batches, from a single cutter device, without the objections heretofore mentioned. Such scheme might be duplicated by the provision of, for example, three such throats and cut-off devices, spaced apart double the distance between center lines of successive rows, and then moving such dough batch cutting device back and forth across the pan with alternate movements, to first supply, for example, rows one, three and five, and thereafter rows two, four and six, etc.

A further feature of my present invention relates to an improved means to ensure a uniform level of the grease or cooking oil in the frying pan. In this connection it will be understood that as the frying operations proceed, and the doughnuts are delivered from the pan, the grease or oil is depleted, and such depletion is also occasioned by evaporation and other causes. This feature of the invention relates to the provision of means whereby as such depletion occurs, the grease or oil is automatically replenished, to thereby maintain the level constant in the pan.

The invention also relates to other objects and uses, which will appear from a detailed description thereof, which consists in the features of construction, and combinations of parts hereinafter described and claimed.

In the drawings:

Figure 1 shows a plan view of a typical construction of doughnut machine embodying the features of the present invention;

Figure 2 shows a side elevation corresponding to Figure 1;

Figure 3 shows an end view corresponding to Figures 1 and 2;

Figure 4 shows a vertical section through the gear box, taken on the line 4—4 of Figure 3, looking in the direction of the arrows;

Figure 6 shows a detail fragmentary view substantially at the position of the line 6—6 of Figure 3, but showing a modified form of drive connection to the turner;

Figure 7 shows a detailed view of a modified form of connection to the link for reciprocating the cutter carriage back and forth, with pauses between the movements thereof in opposite directions;

Figure 5:
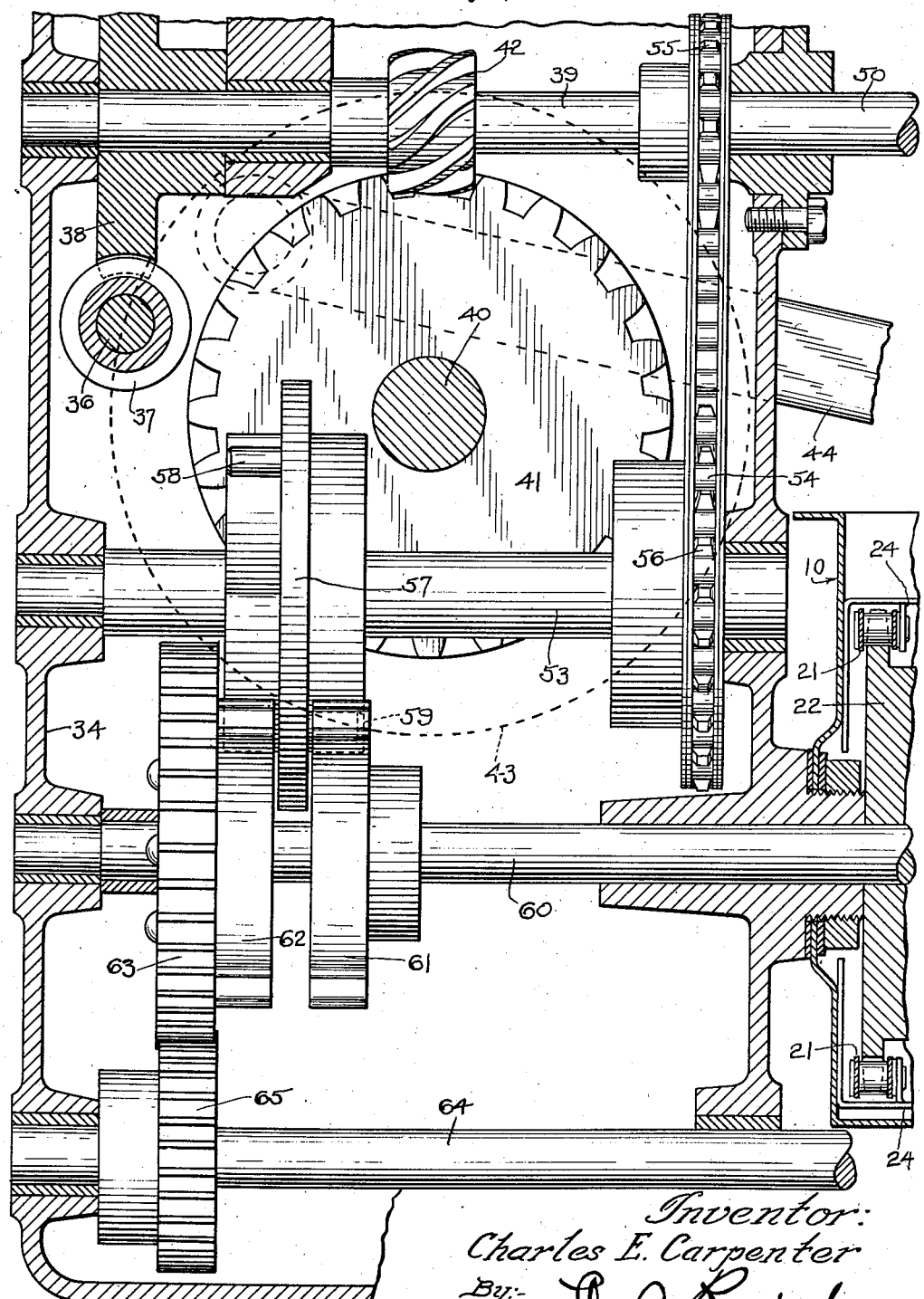
Figure 5 shows a cross-section through the gear box at right angles to Figure 4, and taken on the line 5—5 of Figure 4, looking in the direction of the arrows.

Referring first to Figures 1 to 5, inclusive, the machine therein shown includes the two parallel pans 10 and 11 for cooking grease or oil. These pans are generally relatively shallow, as shown in Figure 2, but their depth is a matter of design. At one end of the structure there is placed the laterally shiftable dough batch cutter, designated in its entirety by the numeral 12. This cutter includes the hopper 13, adapted to carry a suitable amount of dough to meet the needs of the two pans. The cutter is so mounted that it may be shifted back and forth laterally across the two pans, for which purpose the cutter is conveniently shown as being provided with a carriage 14 in the form of a series of eyes which are slidingly mounted on the cross rods 15 and 16, said rods in turn being carried by the brackets 17 and 18 at the sides of the machine. The arrangement is such that the hopper and complete cutter may be shifted back and forth an amount to meet the needs presently to be explained.

Suitable means may be provided to heat the pans, the arrangement shown including the lengthwise extending burners 19 and 20 located beneath the pans.

Each of the pans is made of width to accommodate more than one row of the frying doughnuts, and in the form shown there is accommodation for two such rows. Manifestly the pans might be made of width to accommodate more than two rows, as for example three or more; and the back and forth reciprocations of the cutter are such that proper registry thereof may be effected with the proper rows of the pans into which the dough batches are to be dropped.

Each pan is provided with means to advance the doughnuts frying therein, lengthwise of said pan from the dropping position of the cutter, and also means are provided to turn over said frying doughnuts at the proper positions in the pans, and to deliver the completely fried doughnuts from the pans. In the arrangement shown the advancing means takes the form of a lengthwise extending continuous belt or chain conveyor, such as 21 (see Figure 2) located along the outer wall of the pan wherein said conveyor is placed, and travelling over the driving pulley or sprocket 22 at one end, and over the idler 23 at the other end of the pan. Each of these conveyors carries a series of transversely extending arms or flights 24 which reach across the pan, and are so secured to the conveyor or the links thereof that said flights will maintain the desired horizontal condition across the pan during all operations. The spacing between the successive flights of the conveyors is equal to the spacing between successive doughnut positions of a row of the doughnuts; and each flight will take care of two or more cooking doughnuts at one and the same time, depending on the number of rows being accommodated within the pan.

At the proper position in the length of each pan (generally about its mid portion) there is located a suitable turner. In the arrangement shown in the drawings each such turner comprises a pair of plates or paddles 25 and 26 lying parallel to each other and at a spacing to permit the doughnut forms to enter and be held between them, said plates or paddles normally standing in horizontal position as evident from several figures, and at a level within the pans such that the doughnuts floating along on the grease or oil will naturally float to position between the plates or paddles while standing in such horizontal position. It will be noted from Figure 1 that the turners are placed and related to the conveyors so that the flights of the conveyors may pass between the turner plates while said plates are horizontal, thereby sweeping the doughnut forms into place between the turner plates on one operation, and sweeping the doughnut forms away from the turner plates on another operation. Furthermore, when the conveyor flights stand in a position such as shown in Figure 1 the turners may be turned over a half revolution to turn over the doughnuts, and without interference with the flights of the conveyors.

At the far or delivery end of each of the pans there is placed a suitable ejector or doughnut delivery device. In the arrangement shown these devices take the forms of the two conveyors 27 and 28 which extend upwardly and over the end wall of the pans from a position low enough to receive the cooked doughnuts which float onto said ejectors, and are carried upwardly from the pans and over the end walls of the pans to a suitable point. It is noted that the conveyor belt or chain of each of these ejectors travels over the driving sprocket or pulley 29 and the idler sprocket or pulley 30; and the drive shaft for each of the drive sprockets or pulleys 29 may be extended to the outside of the pan and there be provided with a sprocket or pulley 31, drivingly connected to a sprocket or pulley 32 outside of the pan and mounted on an extension of the idler shaft for the corresponding idler 23, such connection being effected by the chain 33. Thus it is seen that each ejector moves in harmony with the corresponding advancing device. It will be understood that each ejector is of proper width to take care of all the rows of cooked doughnuts arriving so as to properly deliver them all from the machine.

Adjacent to the bracket 18 there is placed and mounted a transmission box 34. The details of the gearing therein contained are shown in Figures 4 and 5. A driving motor 35 is mounted in one wall of this transmission box, and the motor shaft 36 thereof extends across the box as shown in Figure 5. This motor shaft carries a worm 37 meshing with the worm gear 38 on the shaft 39, and it will be noted that said shaft 39 thus extends in a direction at right angles to the length of the pans. A stub shaft 40 is journalled in the back wall of the transmission housing, and carries a worm or spiral gear 41 which is engaged by the worm 42 on the shaft 39. This gives a double gear reduction from the motor shaft to the stub shaft. On its back and outside end the stub shaft carries the disk 43; and a link 44 connects this disk to the carriage in which the cutters, hopper, and related parts are carried. In the arrangement shown the link 44 connects to a plate 45 extending between the downwardly depending throats or other parts 46 and 47 of the two cutters, but manifestly any other suitable form of connection might be substituted therefor.

With the arrangement shown in Figure 3 in particular, the cutter carriage is reciprocated back and fourth a complete cycle for each rotation of the shaft 40 and disk 43; and furthermore, by proper proportioning of the parts the distance of such reciprocation may be made equal to the distance between center lines of the rows in a pan. It will also be noted that with the arrangement just explained the reciprocating movements of the cutter carriage are continuous, that is, at the completion of movement in one direction the return movement immediately commences. Sometimes it will be desirable to ensure a pause at the completion of movement in each direction, in which case a modification such as shown in Figure 7 may be adopted. In this case the end of the link is provided with a slot 48 engaged by the pin 49 on the disk; the arrangement being such that as the disk rotates away from a pin position such as in Figure 7, the first portion of such rotation causes the pin to move to the end of the slot with a lost motion, whereupon the link is pulled to the right, such action continuing until the extreme right hand position is reached, whereupon the continued rotation of the disk and pin will permit a pause in the return movement of the link and carriage until the lost motion of the slot has again been taken up, whereupon the return movement of the link and carriage will again commence. It should be noted that by proper proportioning of the parts the desired amount of carriage movement backwardly and forwardly may be produced, together with the desired amount of pause at each extremity of such movement.

Now, each cutter or doughnut dropper is provided with suitable means to deliver and cut-off the dough batches which are delivered downwardly from the hopper above, the details of which means constitute no portion of the present invention. Generally, however, these devices of the dough batch cutter must be operated in proper driving manner, and such operation must of course be effective for all operating positions of the cutters. I have therefore shown the cross-wise extending shaft 50 in Figure 3 which extends through both of the throat or other downwardly extending portions 46 and 47 of the two cutters, and which shaft is provided with spline slots such as 51 and 52 for the two cutters, so that driving connections to the devices of both said cutters are effected at all operative positions of the cutters. In the arrangement shown the shaft 50 is in alignment with the shaft 39 of the transmission, and in fact may constitute an extension thereof, as shown in Figure 5.

Extending across the transmission housing at a lower elevation than the shaft 39 there is the shaft 53 drivingly connected to the shaft 39 by the chain 54 travelling over the sprockets 55 and 56 on the two shafts. The shaft 53 carries the pin disk 57 carrying the Geneva pins 58 and 59 which project from said disk at opposite sides thereof, and at diametrically opposite positions. At a still lower elevation the transmission housing carries the transversely extending shaft 60 which reaches through both the frying pans and carries the two drive sprockets 22 for the advancing conveyors of both pans. The shaft 60 has the Geneva wheel 61 which is of the form shown in Figure 4, and has the four slots so that it is rotated one-fourth revolution for each rotation of the shaft 53 carrying the pin disk and pin 59. By this means the conveyor shaft 60 is turned one-fourth revolution for each rotation of the shaft 53, and with an intermittent movement, with periods of pause between such movements.

Freely mounted on the shaft 60 is the additional Geneva wheel 62, also having four slots as shown in Figure 4, so that as the pin disk 57 comes around for each revolution, said wheel 62 is turned one-fourth revolution. It will be noted, however, that due to the fact that the pins 58 and 59 of the pin disk are placed at diametrically opposite positions on the pin disk, the movements of the wheels 61 and 62 take place alternately, first one and then the other. The Geneva wheel 62 is connected to a gear wheel 63, also loose on the shaft 60; and at a still lower elevation in the transmission housing is the transversely extending shaft 64, having the pinion 65 meshing with the gear 63, the pinion and gear aforesaid being of such ratio that the shaft 64 will make one-half revolution for each one-fourth revolution of the Geneva wheel 62. Thus the shaft 64 is rotated intermittently with movements of one-half revolution each time.

The shaft 64 extends beneath the near pan 10 to a position between the pans, as shown in Figure 3, where it carries a crank arm 65ª; and a link 66 connects this crank arm with a rack bar 67 meshing with a gear wheel 68 which connects to the shafts or hubs on which are carried the pairs of plates or paddles 25 and 26 for the two turners. The parts are so proportioned that for each one-half turn of the shaft 64, with corresponding reversal of the crank 65 the turners will be turned over from one horizontal position to the other horizontal position to effect a proper turning operation. It will also be noted that the opposite positioning of the pins 58 and 59 on the pin disk will effect such turning movement during the time the advancing conveyors are stationary, so that proper timing of the parts is ensured.

Sometimes it will be desirable to make use of a turner device in which the turning movements are always in the same direction (instead of alternately back and forth as with the arrangement just described). In such case the turner shafts or hubs may be provided with a spiral gear 69 meshing with a corresponding gear 70 (see Figure 6), mounted on the shaft 71, which shaft 71 may then be either the shaft 64, extended, or connected thereto, so that the intermittent rotations of the shaft 64 will be properly communicated to the spiral gears 69 and 70 for half turns of the turners.

Now it was explained that the back and forth movements of the cutters are to be of such amount as to carry each throat or dropper a distance from the center line of one row to the center line of the adjacent row. It will be observed that the two throats or similar parts 46 and 47 are located a distance apart much greater than the distance between the center lines of two adjacent rows, since each such throat or device serves two different rows. Examination of Figures 1 and 3 shows that there is provided a ridge or division 72 between the lower portions of the hopper sections serving the two throats, so that the downwardly flowing dough will naturally separate or divide into two streams flowing to the two throats; and due to the fact that said throats are located a distance apart much greater than the distance between the center lines of two adjoining rows of doughnuts it follows that the downwardly moving dough in and from the hopper may properly divide and adjust itself fully to the needs of each throat, and without the tendency which has heretofore existed for one throat to rob the other, and vice versa, when the two throats have been placed close together, as where they are placed apart only the distance equal to the distance between the center lines of adjacent rows of doughnuts.

It must be further evident that the placement of the two or more throats at such increased distance apart is definitely related to the fact that the cutters are moved back and forth across the multiple row pans, so that dropping operations may be effected first to one set of rows, and then to the other intermediate set or sets of rows. If such alternate back and forth movements were not provided for it would result that the number of rows of cooking doughnuts which could be fried in a pan or pans of given width would be halved, or in other words, a pan or pans of double width would be needed for a given capacity in doughnuts fried per hour.

The following operations are also noted, keeping in mind especially the arrangement shown in Figure 7; with the arrangement of that figure, movement from the left hand extreme position of the pin 49 to the top position 73 does not shift the cutter carriage from its extreme left hand position; but the full carriage movement from left to right is effected by pin movement from the position 73 to the position 74. Then, movement of the pin from the position 74 to the position 75 does not result in any movement of the carriage towards the left, but the leftward movement is effected entirely during pin movement from the position 75 back to the position 49. Thus, each carriage movement is effected during a one-quarter turn of the disk 43, and the carriage stands stationary during the intermediate intervals. By proper timing of the gear parts it is possible to get the following operation sequence; with the carriage at one extreme position (for example, the left hand position) a pair of dough batches is dropped as soon as that position is reached (one in each pan), then the advancing conveyors are advanced and another pair of dough batches is dropped just behind the ones first mentioned, then the carriage is shifted to the right hand extreme of movement and immediately thereafter a set or pair of dough batches is dropped at that position, then the advancing conveyors are advanced and another pair of dough batches is dropped at the right hand position just behind the ones previously dropped, then the carriage is shifted to the left hand position, and the cycle is repeated.

Figure 8:
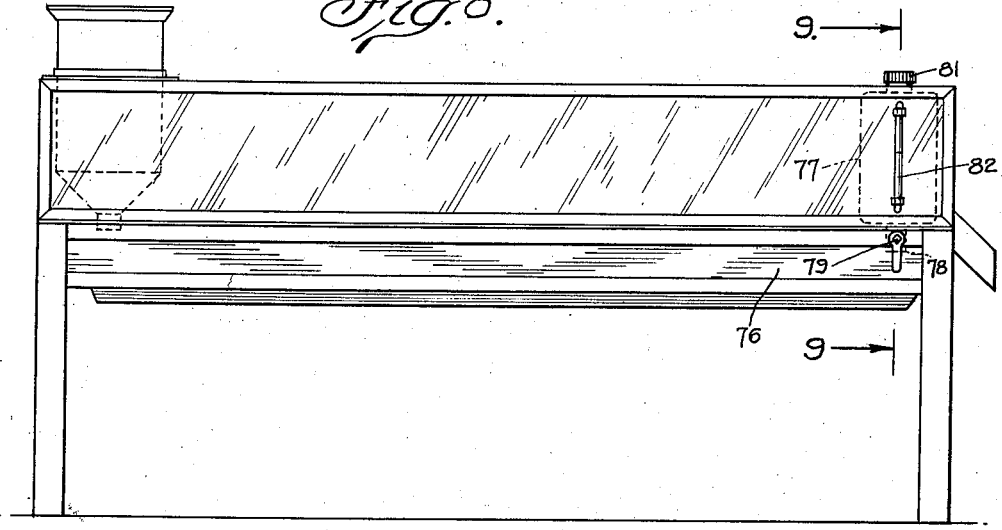
Figure 8 shows a side elevation of another form of machine having applied to one end thereof means to maintain the level of the grease or oil automatically at the desired point.
Figure 9:
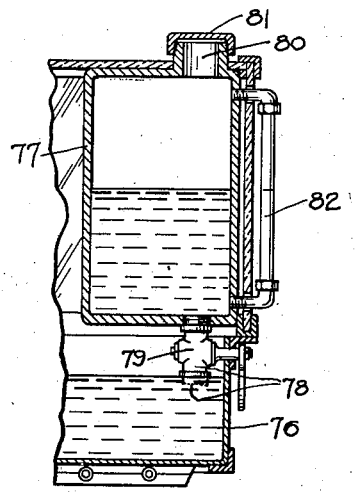
Figure 9 shows on enlarged scale a section on the line 9—9 of Figure 8, looking in the direction of the arrows.

In Figures 8 and 9 I have shown one form of arrangement for maintaining a constant level of the oil or grease in the frying pan or pans. In this arrangement, the pan is shown at 76. An air-tight container for the oil is placed above the pan at a suitable point as shown at 77, and has in its lower end or bottom a nipple 78 which reaches down into the pan to the desired oil level therein. If desired a valve 79 may be placed in this nipple to cut off the delivery of oil when the operations are completed, or for other reasons. The container has in its upper portion a filling opening 80 having a cap 81 by which the same may be closed in air tight manner. With this arrangement it will be evident that upon opening the valve 78 the oil may flow from the container down into the pan until the level of oil in the pan reaches the lower end of the nipple. During this interval air may find its way back up into the pan to occupy the space therein vacated by the outflowing oil, but as soon as the oil level in the pan reaches the lower end of the nipple, said nipple will be sealed, so that no further air can enter the container, and downward movement of the oil will cease. This condition will obtain until there has been a depletion of oil in the pan sufficient to again expose the opening in the lower end of the nipple, whereupon a further seepage of oil into the pan will occur until the proper level has been again established. This arrangement may be known as a barometric feed.

If desired a gauge glass 82 may be provided in connection with the container 77 so that the operator may know the condition of depletion of the oil therein.

Figure 10:
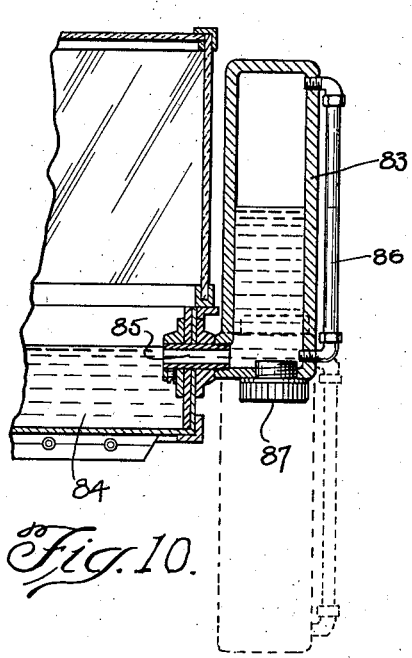
Figure 10 shows a section through another form of oil or grease level maintaining device.

In the modified arrangement shown in Figure 10, the container 83 is connected to the pan 84 by a swivel nipple connection 85 whereby the container may be turned through a one-half turn to invert said container, the said nipple connection being located at the desired level of oil within the pan. With this arrangement, as the oil becomes depleted in the pan the level therein falls until air is permitted to leak through the nipple into the container 83, whereupon the oil will seep through the nipple and to the pan until the level in the pan has again been restored. The gauge glass 86 may be provided in the container 83 to show the operator the level of the oil in the container.

It will be noted that the nipple 85 of this arrangement is located close to the floor of the container 83, and a plug 87 is provided in said floor. By inverting the container into the dotted line position of Figure 10, any contained oil therein will flow to the bottom (normally the top) of the container, and the plug 87 may be removed, and an additional supply of oil may then be added to the container. Thereupon the container may be again turned right side up and operations will continue in a normal manner.

While I have herein shown and described only certain embodiments of the features of my present invention, still I do not intend to limit myself thereto, except as I may do so in the claims to follow.

It may be noted that while I have herein shown an arrangement in which use is made of two distinct pans lying parallel to each other, and each accommodating several rows of doughnuts (two in the form shown), still it is evident that all the rows might be accommodated within a single pan of sufficient width, and therefore I do not limit myself to the multiple pan arrangement, except as I may do so in the claims to follow.

It will be noted from examination of Figures 8, 9 and 10 that in each case the container (77 or 83, as the case may be) is so located that it is subject to the heat from the frying pan, so that the grease or oil therein is kept at all times in free flowing condition so that such grease or oil will freely flow to the pan under barometric control and as needed in the pan.

I claim:

1. In a doughnut machine, the combination of a pair of parallel frying pans each of width to accommodate at least two rows of doughnuts, means to advance the doughnuts in each pan lengthwise of said pan from a dropping position towards a delivery position with a step by step movement, and means to form and drop the dough batches into the pans at the dropping position including a single dough hopper, downwardly extending throats and cutting devices in connection with said hopper and suitably spaced to simultaneously occupy positions over alternate rows of doughnuts in the pans, whereby said throats are separated from each other a distance greater than the distance between center lines of adjacent rows of doughnuts in the pans, means to mount said hopper and connected parts including the throats permitting lateral movement thereof over the pans through a distance equal to the distance between the center lines of adjacent rows of doughnuts in the pans, and means to operate all said parts in timed relationship to drop dough batches in the following sequence, namely, a dough batch in one row of each pan, then advance the advancing means, then another dough batch in each row just mentioned, then shift the hopper and connected parts laterally over the other rows of doughnuts, then drop a dough batch in each such other row, then advance the advancing means, then drop another dough batch in each such other row, then shift the hopper and connected parts laterally back to their original position, and repeat the cycle, substantially as described.

2. In a doughnut machine, the combination of a pair of parallel frying pans each of width to accommodate at least two rows of doughnuts, means to advance the doughnuts in each pan lengthwise of said pan from a dropping position towards a delivery position with a step by step movement, and means to form and drop the dough batches into the pans at the dropping position including a single dough hopper, downwardly extending throats and cutting devices in connection with said hopper and suitably spaced to simultaneously occupy positions over alternate rows of doughnuts in the pans, whereby said throats are separated from each other a distance greater than the distance between center lines of adjacent rows of doughnuts in the pans, means to mount said hopper and connected parts including the throats permitting lateral movement thereof over the pans through a distance equal to the distance between the center lines of adjacent rows of doughnuts in the pans, and means to operate all said parts in timed relationship to drop dough batches in a sequence wherein there are two dropping operations for each row with an advancing movement between said dropping operations, and wherein there is a lateral shifting movement of the hopper and throats and connected parts with a dropping operation at the beginning and ending of such lateral shifting movement without advancement of the advancing means during such operations, substantially as described.

3. In a doughnut machine, the combination of a pair of parallel frying pans each of width to accommodate at least two rows of doughnuts, means to advance the doughnuts in each pan lengthwise of said pan from a dropping position towards a delivery position with a step by step movement, and means to form and drop the dough batches into the pans at the dropping position including a single dough hopper, downwardly extending throats and cutting devices in connection with said hopper and suitably spaced to simultaneously occupy positions over alternate rows of doughnuts in the pans, whereby said throats are separated from each other a distance greater than the distance between center lines of adjacent rows of doughnuts in the pans, means to mount said hopper and connected parts including the throats permitting lateral movement thereof over the pans through a distance equal to the distance between the center lines of adjacent rows of doughnuts in the pans, and means to operate all said parts in timed relationship to drop dough batches in a sequence wherein there are two dropping operations for each row with an advancing movement between said dropping operations, substantially as described.

4. In a doughnut machine, the combination of a pair of parallel frying pans each of width to accommodate at least two rows of doughnuts, means to advance the doughnuts in each pan lengthwise of said pan from a dropping position towards a delivery position with a step by step movement, and means to form and drop the dough batches into the pans at the dropping position including a single dough hopper, downwardly extending throats and cutting devices in connection with said hopper and suitably spaced to simultaneously occupy positions over alternate rows of doughnuts in the pans, whereby said throats are separated from each other a distance greater than the distance between center lines of adjacent rows of doughnuts in the pans, means to mount said hopper and connected parts including the throats permitting lateral movement thereof over the pans through a distance equal to the distance between the center lines of adjacent rows of doughnuts in the pans, and means to operate all said parts in timed relationship to drop dough batches in a sequence wherein there is an advancing movement between a pair of dropping operations at the laterally moved positions of the hopper and throats and connected parts, substantially as described.

5. In a doughnut machine, the combination of pan means for frying the doughnuts and of size to accommodate four or more rows of the frying doughnuts, means to advance the doughnuts in said pan means with a step by step movement from the dropping position towards a delivery position, and means to form and drop the dough batches into the pan means at the dropping position including a single dough hopper, downwardly extending throats and cutting devices in connection with said hopper and suitably spaced to simultaneously occupy positions over alternate rows of doughnuts in the pan means, whereby said throats are separated from each other a distance greater than the distance between center lines of adjacent rows of doughnuts in the pan means, means to mount said hopper and connected parts including the throats permitting lateral movement thereof over the pan means through a distance equal to the distance between the center lines of adjacent rows of doughnuts in the pan means, and means to operate all said parts in timed relationship to drop dough batches in a sequence wherein there are two dropping operations for each row with an advancing movement between said dropping operations, substantially as described 6. In a doughnut machine, the combination of pan means for frying the doughnuts and of size to accommodate four or more rows of the frying doughnuts, means to advance the doughnuts in said pan means with a step by step movement from the dropping position towards a delivery position, and means to form and drop the dough batches into the pan means at the dropping position including a single dough hopper, downwardly extending throats and cutting devices in connection with said hopper and suitably spaced to simultaneously occupy positions over alternate rows of doughnuts in the pan means, whereby said throats are separated from each other a distance greater than the distance between center lines of adjacent rows of doughnuts in the pan means, means to mount said hopper and connected parts including the throats permitting lateral movement thereof over the pan means through a distance equal to the distance between the center lines of adjacent rows of doughnuts in the pan means, and means to operate all said parts in timed relationship to drop dough batches in a sequence wherein there are two dropping operations for each row with an advancing movement between said dropping operations, substantially as described.

7. In a doughnut machine, the combination with a frying pan means of size to accommodate at least four rows of doughnuts, of a dough hopper shiftably mounted above said pan means to permit lateral shifting thereof with respect to the pan means, dough batch delivery means in connection with said hopper for simultaneous delivery of at least two dough batches at lateral spacing corresponding to the spacing of alternate rows of doughnuts in the pan means, means to shift the hopper and connected parts laterally with respect to the pan means, between lateral extremes of movement, and means to actuate the dough delivery means aforesaid for consecutive dropping of two sets of dough batches consecutively at each lateral extreme of movement aforesaid, substantially as described.

8. In a doughnut machine, the combination with a frying pan means of size to accommodate at least four rows of doughnuts, of a dough hopper shiftably mounted above said pan means to permit lateral shifting thereof with respect to the pan means, dough batch delivery means in connection with said hopper for simultaneous delivery of at least two dough batches at lateral spacing corresponding to the spacing of alternate rows of doughnuts in the pan means, means to shift the hopper and connected parts laterally with respect to the pan means, to thereby bring the dough batch delivery means to delivery position over alternate rows in the pan means, and means to actuate the dough delivery means aforesaid for consecutive dropping of two sets of dough batches consecutively at the positions of such alternate rows, substantially as described.

9. In a doughnut machine, the combination with a frying pan means of size to accommodate at least four rows of doughnuts, of a dough hopper shiftably mounted above said pan means to permit lateral shifting thereof with respect to the pan means, dough batch delivery means in connection with said hopper for simultaneous delivery of at least two dough batches at lateral spacing corresponding to the spacing of alternate rows of doughnuts in the pan means, means to shift the hopper and connected parts laterally with respect to the pan means, to thereby bring the dough batch delivery means to delivery position over alternate rows in the pan means, and means to actuate the dough delivery means at each such laterally shifted position, substantially as described.

10. In a doughnut machine, the combination with a frying pan means of size to accommodate a plurality of rows of doughnuts of even number, of a pair of dough batch delivery devices located above said pan means and laterally shiftable thereover between at least two dough batch dropping positions, said dough batch delivery devices being spaced apart a distance corresponding to alternate rows of doughnuts in the pan means, means to operate said dough batch delivery devices at all delivery positions thereof, and means to effect shifting of said dough batch delivery devices alternately back and forth over the pan means, substantially as described.

11. In a doughnut machine, the combination with a frying pan means of size to accommodate a plurality of rows of doughnuts of even number, of a pair of dough batch delivery devices located above said pan means and laterally shiftable thereover between at least two dough batch dropping positions, said dough batch delivery devices being spaced apart a distance corresponding to the distance between at least two rows of doughnuts in the pan means, means to operate said dough batch delivery devices at all delivery positions thereof, and means to effect shifting of said dough batch delivery devices to various delivery positions over the pan means, substantially as described.

12. In a doughnut machine, the combination with a frying pan means of size to accommodate a plurality of rows of doughnuts, of a pair of dough batch delivery devices located above said pan means and laterally shiftable thereover between at least two dough batch dropping positions, said dough batch delivery devices being spaced apart a distance corresponding to the distance between at least two rows of doughnuts in the pan means, means to operate said dough batch delivery devices at all delivery positions thereof, and means to effect shifting of said dough batch delivery devices to various delivery positions over the pan means, substantially as described.

13. The combination with a doughnut frying pan, and means to heat the same, of means to automatically deliver frying grease or oil to said pan, comprising an air tight container for said material located at a higher level than the intended level of the grease or oil within the pan, and a grease or oil delivery connection from said container to the pan at the intended level of the grease or oil therein, whereby a barometric delivery of said grease or oil to the pan is effected, substantially as described.

14. The combination with a doughnut frying pan, and means to heat the same, of means to automatically deliver frying grease or oil to the pan, comprising an air tight container for said material located at a higher level than the intended level of the grease or oil within the pan and at a position subject to heating action from the pan, and a delivery connection of substantial size from said container to the pan at the intended level of the grease or oil in the pan, whereby the material in the container is maintained in desired free flowing condition, and whereby a barometric delivery of said grease or oil to the pan is effected, substantially as described.

15. The combination with a doughnut frying pan, and means to heat the same, of means to automatically deliver frying grease or oil to the pan, comprising an air tight container for said material, a swivel nipple connection from said container to the pan at the intended level of grease or oil therein, and a suitable filling opening and closure therefor at another position in said container, whereby when the container stands in one position of swivelling movement the grease or oil therein may deliver to the pan by a barometric delivery, and whereby when the container stands in another position of swivelling movement the closure aforesaid may be removed for filling of the container, substantially as described.

16. In a doughnut machine, the combination of a frying pan, of size to accommodate at least four rows of doughnuts, and a dough hopper mounted above said pan, and dough batch delivery means in conjunction with said hopper for simultaneous delivery of at least two dough batches at lateral spacing corresponding to the spacing of alternate rows of doughnuts in the pan, and means to support said pan and said hopper and dough batch delivery means for relative lateral shifting of said pan and said hopper and dough batch delivery means with respect to each other through a distance equal to the spacing between rows in the pan, together with means to periodically operate the dough batch delivery means and the relative lateral shifting of the parts in proper timing to deliver dough batches into the pan rows in succession, substantially as described.

17. In a doughnut machine, the combination of a frying pan, of size to accommodate at least four rows of doughnuts, and a dough hopper mounted above said pan, and dough batch delivery means in conjunction with said hopper for simultaneous delivery of at least two dough batches at lateral spacing corresponding to the spacing of alternate rows of doughnuts in the pan, and means to support said pan and said hopper and dough batch delivery means for relative lateral shifting of said pan and said hopper and said dough batch delivery means with respect to each other through a distance equal to the spacing between rows in the pan, means to effect such relative lateral shifting, means to actuate such dough batch delivery means, and means to operate said parts in timing with respect to each other effectively to drop dough batches in all pan rows and with uniform spacing between dough batches in all the rows, substantially as described.

18. In a doughnut machine, the combination of a frying pan, of size to accommodate an even number of rows of doughnuts of at least four such rows, a dough hopper, and dough batch delivery means in conjunction with said hopper for simultaneous delivery of at least two dough batches at lateral spacing corresponding to the spacing of alternate rows of doughnuts in the pan, and means to support the pan and said hopper and dough batch delivery means for relative lateral shifting of said pan and said hopper and said dough batch delivery means with respect to each other through a distance equal to the spacing between rows in the pan, means to effect such lateral shifting, means to actuate the dough batch delivery means, and means to operate said parts in timing with respect to each other effectively to drop dough batches in all rows and with uniform spacing between dough batches in all the rows, substantially as described.

19. In a doughnut machine, the combination of a frying pan, of size to accommodate a plurality of rows of doughnuts of at least four rows, a dough hopper, and dough batch delivering means in conjunction with said hopper for simultaneous delivery of at least two dough batches at lateral spacing equal to the spacing of alternate rows of doughnuts in the pan, and means to support the pan and said hopper and dough batch delivery means for relative lateral shifting of the pan and said hopper and said dough batch delivery means with respect to each other through a distance equal to the spacing between rows in the pan, the number of rows in the pan being a multiple of the number of said dough batch delivery means, means to actuate the dough batch delivery means, and means to actuate all said parts in timing with respect to each other effectively to drop dough batches in all rows and with a uniform spacing between the dough batches in all the rows, substantially as described.

CHARLES E. CARPENTER.